United States Patent
Kunigita et al.

(10) Patent No.: US 9,230,298 B2
(45) Date of Patent: Jan. 5, 2016

(54) INFORMATION PROCESSING DEVICE, AND INFORMATION PROCESSING SYSTEM

(75) Inventors: Hisayuki Kunigita, Kanagawa (JP); Il-Kwon Cho, Seoul (KR); Jae-Hyun Park, Seoul (KR); Yeon-Sook Kim, Seoul (KR); Ju-Yeong Ji, Seoul (KR)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 856 days.

(21) Appl. No.: 13/512,057

(22) PCT Filed: Nov. 11, 2010

(86) PCT No.: PCT/JP2010/006644
§ 371 (c)(1),
(2), (4) Date: Jul. 26, 2012

(87) PCT Pub. No.: WO2011/067899
PCT Pub. Date: Jun. 9, 2011

(65) Prior Publication Data
US 2012/0287152 A1  Nov. 15, 2012

(30) Foreign Application Priority Data
Dec. 1, 2009  (JP) .................. 2009-273847

(51) Int. Cl.
G09G 5/00 (2006.01)
G09G 5/37 (2006.01)
(Continued)

(52) U.S. Cl.
CPC ................ *G06T 3/40* (2013.01); *G06F 3/0481* (2013.01); *G06F 3/04845* (2013.01);
(Continued)

(58) Field of Classification Search
CPC ........... G06T 11/00; G06T 15/30; G06T 1/60; G06T 11/60; G06T 3/40; G09G 5/14; G09G 5/393; G06F 3/0481; G06F 3/04842; G06F 3/04812; G06F 3/04845; A63F 13/00; A63F 2300/203

USPC .................................................. 345/628, 682
See application file for complete search history.

(56) References Cited

U.S. PATENT DOCUMENTS 6,563,999 B1    5/2003  Suzuoki
2002/0031262 A1*  3/2002  Imagawa et al. .............. 382/190
(Continued)

FOREIGN PATENT DOCUMENTS

JP  2002278994 A   9/2002
JP  2002335396 A  11/2002
(Continued)

OTHER PUBLICATIONS

International Search Report for the corresponding PCT Application No. PCT/JP2010/006644, dated Dec. 7, 2010.
(Continued)

*Primary Examiner* — James A Thompson
*Assistant Examiner* — Nicole Gillespie
(74) *Attorney, Agent, or Firm* — Matthew B. Dernier, Esq.

(57) ABSTRACT

A displayed image generation unit enlarges, reduces, or scrolls a displayed image in accordance with a command for change from a user. When a clip command receiving unit receives a clip command, a clipping area identification unit identifies an area to be clipped according to the clip command. A thumbnail image generation unit generates a thumbnail image corresponding to the identified area. A positional information acquisition unit acquires positional information identifying a position of the identified area in an image as a whole. A content ID acquisition unit acquires identification information identifying an image when the clipping command is received. A hard disk drive maps the identification information, the thumbnail image, and the positional information and stores the mapped information.

11 Claims, 12 Drawing Sheets

(51) Int. Cl.
*G06T 3/40* (2006.01)
*G06F 3/0484* (2013.01)
*G06F 3/0481* (2013.01)

(52) U.S. Cl.
CPC .... *A63F 2300/308* (2013.01); *A63F 2300/556* (2013.01); *A63F 2300/8017* (2013.01); *G06F 2203/04806* (2013.01)

(56) References Cited

U.S. PATENT DOCUMENTS

| 2007/0057966 | A1* | 3/2007 | Ohno et al. | 345/619 |
| 2007/0200953 | A1* | 8/2007 | Liu et al. | 348/561 |
| 2010/0321410 | A1* | 12/2010 | Jenks et al. | 345/676 |
| 2012/0042251 | A1* | 2/2012 | Rodriguez | 715/723 |

FOREIGN PATENT DOCUMENTS

| JP | 2004062671 A | 2/2004 |
| JP | 2007041943 A | 2/2007 |
| JP | 2007086827 A | 4/2007 |

OTHER PUBLICATIONS

International Preliminary Examination Report on Patentability with Written Opinion for the corresponding PCT Application No. PCT/JP2010/006644, dated Jul. 10, 2012.

Office Action for corresponding Japanese Patent Application No. 2009-273847, Jul. 30, 2013.

* cited by examiner

INFORMATION PROCESSING DEVICE, AND INFORMATION PROCESSING SYSTEM

TECHNICAL FIELD

The present invention relates to a technology used in information processing devices configured to process image data.

BACKGROUND ART

Home entertainment systems are proposed capable of playing back moving images as well as running game programs. In home entertainment systems, a GPU generates three-dimensional images using polygons.

[patent document No. 1] U.S. Pat. No. 6,563,999

Technologies have been proposed adapted to use tile images of a plurality of resolutions generated from a digital image such as a high-definition photo, to enlarge/reduce a displayed image or move the image upward, downward, leftward, or rightward. In this image processing technology, images of different resolutions are generated by reducing the size of a whole image (original image) in a plurality of stages, and the image in each layer is divided into one or a plurality of tile images, thereby representing the original image in a hierarchical structure. Normally, the image with the lowest resolution comprises one tile image. The original image with the highest resolution comprises the largest number of tile images. The information processing device enlarges or reduces a displayed image such that an enlarged view or a reduced view is presented efficiently by switching a currently used tile image to a tile image in a different layer. According to this image processing technology, high display resolution is maintained and a high-definition image is presented to the user when an image to be displayed is enlarged or reduced.

In association with improvement in high-speed network environments, services of delivering content data such as video and music over the Internet have become popular. A terminal device therefore need not maintain tile images in all layers to process images using tile images. An image for display (displayed image) can be generated in an almost real-time response to a change command from the user, by acquiring necessary tile images from a server as needed.

SUMMARY OF THE INVENTION

We have recognized the usefulness of this image processing technology and conceived of a novel application that uses this image processing technology. We have also conceived of an application that allows a plurality of users to share information by linking the image processing technology and high-speed communication.

A purpose of the present invention is to provide a technology useful to process image data.

To address the problem, the information processing device according to at least one embodiment of the present invention is adapted to display a whole image or a part of the whole image on a display, and comprises: a first receiving unit configured to receive a change command to change the displayed image; an image processing unit configured to generate the displayed image which is the whole image or a part of the whole image, in accordance with the change command to change the displayed image; a second receiving unit configured to receive a clip command; and a clipping process unit configured to clip the displayed image in accordance with the clip command. The clipping process unit comprises: a clipping area identification unit configured to identify an area in the image to be clipped according to the clip command; a thumbnail image generation unit configured to generate a thumbnail image corresponding to the identified area; a positional information acquisition unit configured to acquire positional information identifying the position of the identified area in the whole image; and a storage unit configured to store the thumbnail image and the positional information, mapping the thumbnail image and the positional information to each other.

Another embodiment of the present invention relates to an information processing device. The information processing device is adapted to display a whole image or a part of the whole image on a display, and comprises: a first receiving unit configured to receive a change command to change the displayed image; a positional information determination unit configured to determine positional information identifying the position of the displayed image in relation to the image as a whole, in accordance with the change command; a displayed image generation unit configured to generate the displayed image in accordance with the determined positional information; and a transmitter unit configured to transmit the determined positional information to another information processing device.

Another embodiment of the present invention relates to an information processing system. The information processing system is provided with a first information processing device and a second information processing device connected over a network, wherein the first information processing device comprises: a first receiving unit configured to receive a change command to change a displayed image; a positional information determination unit configured to determine positional information identifying the position of the displayed image in relation to a whole image, in accordance with the change command; a displayed image generation unit configured to generate the displayed image which is the whole image or a part of the whole image in accordance with the determined positional information; and a transmitter unit configured to transmit the determined positional information to the second information processing device. The second information processing device comprises: a receiver unit configured to receive the positional information; and a displayed image generation unit configured to generate the displayed image in accordance with the received positional information.

Optional combinations of the aforementioned constituting elements, and implementations of the invention in the form of methods, apparatuses, systems, and computer programs may also be practiced as additional modes of the present invention.

DETAILED DESCRIPTION OF THE INVENTION

Figure 1:
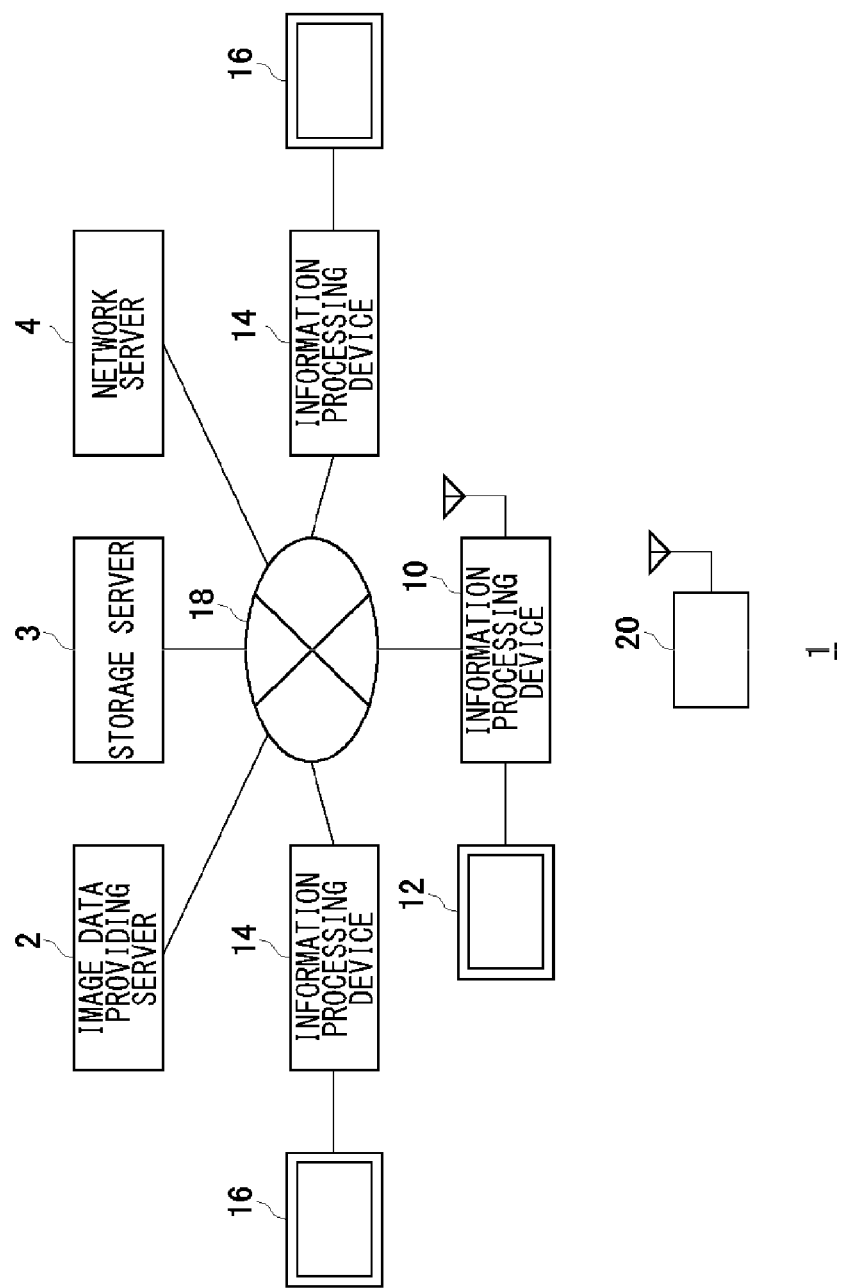
FIG. 1 shows an information processing system according to an embodiment of the present invention.

FIG. 1 shows an information processing system 1 according to an embodiment of the present invention. The information processing system 1 comprises information processing devices 10 and 14, an image data providing server 2, a storage server 3, and a network server 4 connected so as to be capable of communication over a network 18, and an input device 20. The network 18 may be the Internet, which uses the TCP/IP protocol.

The information processing device 10 is provided with an output device 12, and the information processing device 14 is provided with an output device 16. The output devices 12 and 16 may be a television set provided with a display for outputting an image and a speaker for outputting sound. Alternatively, the output devices 12 and 16 may be a computer display. The output devices 12 and 16 may be connected to the information processing devices 10 and 14 by cable or connected wirelessly using, for example, wireless LAN (Local Area Network). The input device 20 is an input interface controlled by a user to provide the information processing device 10 with a control command from the user. The information processing device 10, the input device 20, and the output device 12 may be formed integrally. For example, the devices may be configured as a mobile terminal provided with image processing function.

The information processing devices 10 and 14 in the information processing system 1 have the function of operating independently to execute image processes. The information processing devices 10 and 14 are configured to have the identical image processing function. Hereinafter, image processing function of the information processing device 10 will be described by way of example, by describing its operation. The information processing device 10 has the function of changing a displayed image such as enlarging/reducing a displayed image displayed on the display of the output device 12 or moving the image upward/downward/leftward/rightward, in accordance with control information provided by the user via the input device 20.

The information processing device 10 may be a game device that runs a GUI application or a game application, and the image processing function may be implemented by loading a program for image processing. The information processing device 10 may be a personal computer capable of running various applications and the image processing function may be implemented by loading a program for image processing.

The information processing device 10 is connected to the network 18 and downloads and acquires tile images necessary to generate a displayed image from the image data providing server 2, in accordance with control information provided via the input device 20. The information processing device 10 may download and acquire the entirety of hierarchical compressed image data from the image data providing server 2.

The image data providing server 2 stores hierarchized image data that represents an image as a whole (entire image) using tile images of a plurality of resolutions. The image data providing server 2 provides the information processing device 10 with tile images necessary to generate a displayed image in the information processing device 10, in accordance with a request from the information processing device 10. The image data providing server 2 may provide the entirety of hierarchical image data to the information processing device 10.

The information processing devices 10 and 14 in the information processing system 1 share information related to content. The information processing devices 10 and 14 may share the information related to content synchronously or asynchronously. According to the embodiment, the information processing devices 10 and 14 may communicate such that the information processing device 10 operates as a host device and the information processing device 14 operates as a client device.

The network server 4 manages communication between the information processing devices 10 and 14. In one embodiment of the information processing system 1, the network server 4 builds a chat system. The information processing device 10 attaches content-related information to a chat message and transmits the message to the information processing device 14. This allows the content-related information to be shared between the information processing devices 10 and 14. The information processing device 14 in the information processing system 1 is also provided with image processing function. Therefore, the information processing devices 10 and 14 can display the same image related to the content.

The information processing device 10 has the function of clipping (scrapping) the whole or part of a displayed image displayed on the output device 12 in accordance with a command provided via the input device 20. The information processing device 10 generates a thumbnail image of the image clipped in the clipping process and stores the thumbnail image in a scrapbook. When a thumbnail image stored in the scrapbook is selected, the information processing device 10 can access the content identified by the thumbnail image. The scrap information is stored in the scrapbook of the information processing device 10. Alternatively, the information may be stored in the storage server 3.

Figure 2:
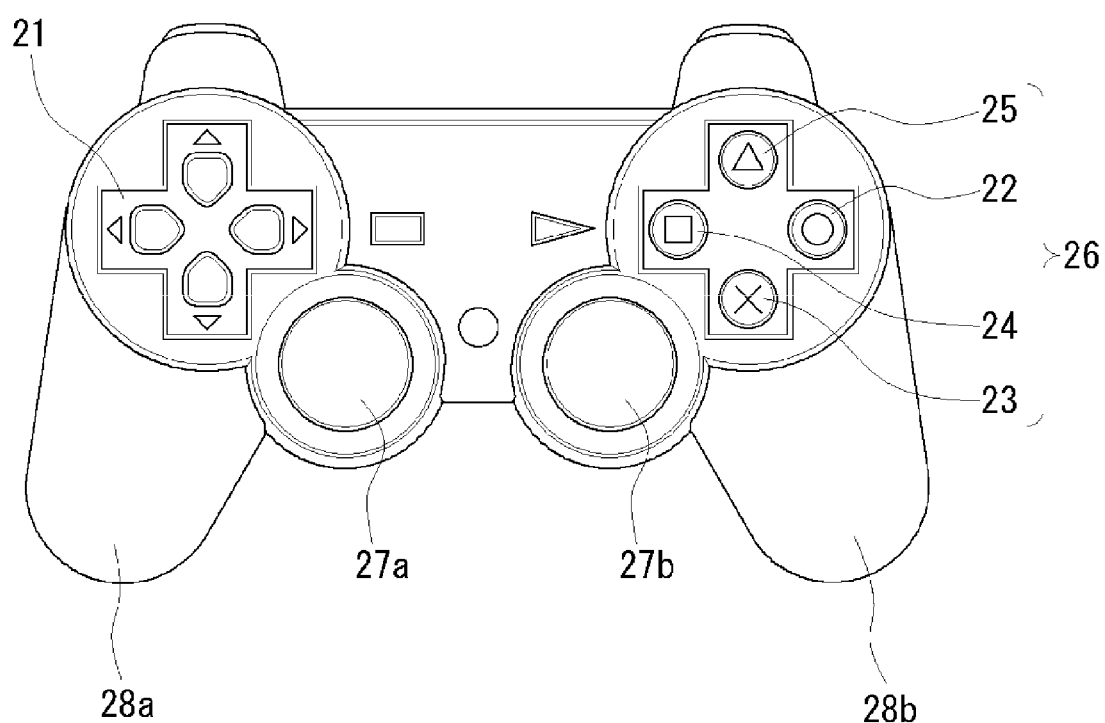
FIG. 2 shows an appearance of an input device.

FIG. 2 shows an appearance of the input device 20. The input device 20 is provided with directional keys 21, analog sticks 27a, 27b, and four control buttons 26, which are means for user control. The four buttons 26 comprises a circle button 22, a cross button 23, a square button 24, and a triangle button 25.

The user control means of the input device 20 in the information processing system 1 is assigned the function of entering a command to enlarge/reduce a displayed image, and entering a command to scroll upward, downward, leftward, or rightward. For example, the function of entering a command to enlarge/reduce a displayed image may be allocated to the right analog stick 27b. The user can enter a command to reduce a displayed image by pulling the analog stick 27b toward the user and can enter a command to enlarge a displayed image by pushing it away from the user. The function of entering a command to scroll a displayed image is assigned to the analog stick 27a. By moving the analog stick 27a forward, backward, leftward, or rightward, the user can enter a command to scroll a displayed image. Commands to enlarge, reduce, and scroll a displayed image will collectively referred to as image change commands in this embodiment.

The input device 20 has the function of transferring an input image change command signal to the information processing device 10. In the embodiment, the input device 20 is configured to be capable of communicating with the information processing device 10 wirelessly. The input device 20 and the information processing device 10 may establish wireless communication using the Bluetooth (registered trademark) protocol or the IEEE802.11 protocol. The input device 20 may be connected to the information processing device 10 via a cable so as to transfer an image change command signal to the information processing device 10.

Figure 3:
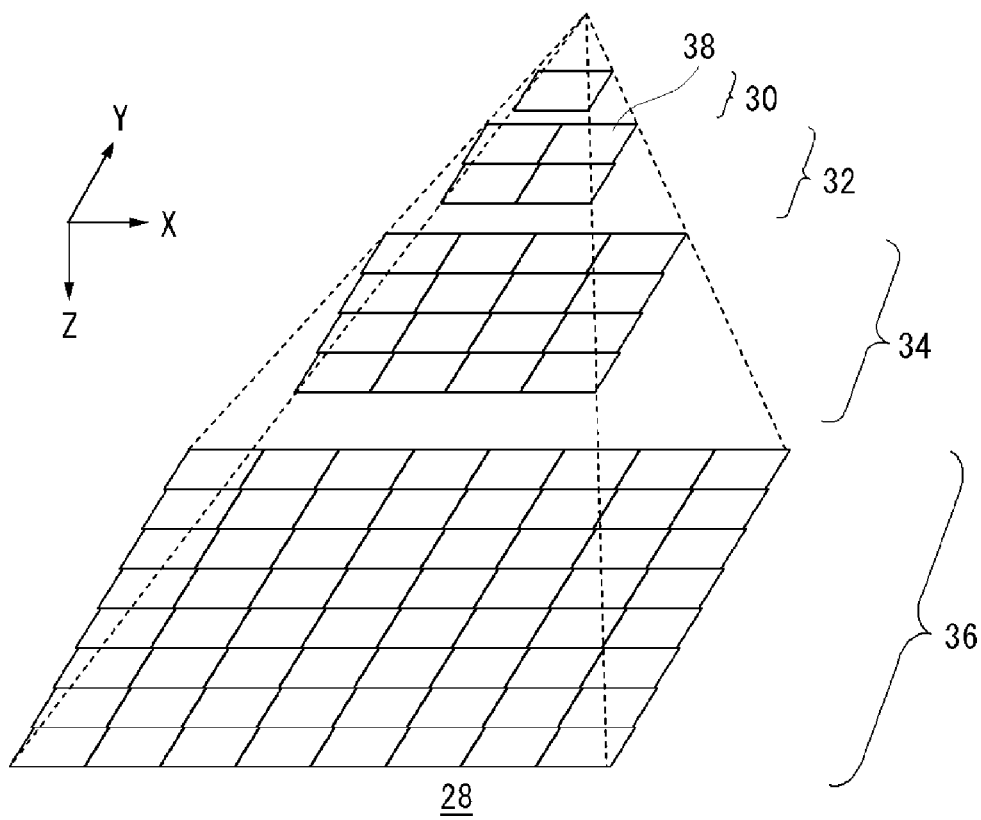
FIG. 3 shows a hierarchical structure of image data used in the information processing system.

FIG. 3 shows the hierarchical structure of image data used in the information processing system 1. The image data is stored in the image data providing server 2. The image data providing server 2 provides tile images necessary to generate a displayed image to the information processing device 10 when needed. The image data providing server 2 may notify the information processing device 10 with structural data indicating the hierarchical structure of the image data. The information processing device 10 may use the data to derive spatial coordinates identifying a frame image (displayed image) by referring to the control information provided via the input device 20. A common hierarchical structure is used throughout different items of content. Therefore, the information processing device 10 may derive spatial coordinates as described below, based on the common structural data.

The image data has a hierarchical structure comprising a 0-th layer 30, a first layer 32, a second layer 34, and a third layer 36 in the direction of depth (Z axis). Hereinafter, image data having such a hierarchical structure will be referred to as "hierarchical data". A layer higher than the fourth layer may be provided. The hierarchical data 28 shown in FIG. 3 has a quadtree hierarchical structure. Each layer comprises one or more tile images 38. All of the tile images 38 are formed to have the same size having the same number of pixels. For example, the images have 256 by 256 pixels, respectively. The image data in the respective layers are representations of a single whole image (content image) in different resolutions. The original image in the third layer 36 having the highest resolution is reduced in a plurality of stages to generate the image data for the second layer 34, the first layer 32, and the 0-th layer 30. For example, the resolution of the Nth layer (N is an integer equal to or greater than 0) may be ½ the resolution of the (N+1)th layer in both the horizontal (X axis) direction and the vertical (Y axis) direction.

In the hierarchical data shown in FIG. 3, the position in the depth (Z axis) direction indicates the resolution. The closer to the 0-th layer 30, the lower the resolution, and, the closer to the third layer 36, the higher the resolution. In terms of the size of the image displayed on the display, a position in the depth direction represents a scaling factor. Assuming that the scaling factor of a displayed image of the third layer 36 is 1, the scaling factor of the second layer 34 is ¼, the scaling factor of the first layer 32 is 1/16, and the scaling factor of the 0-th layer 30 is 1/64. Therefore, if a displayed image changes in the depth direction away from the 0-th layer 30 toward the third layer 36, the displayed image is enlarged. If a displayed image changes in the direction away from the third layer 36 toward the 0-th layer 30, the displayed image is reduced.

In the image data providing server 2, the hierarchical data 28 is stored in a storage device in a predefined compressed format. Compression process of the hierarchical data may be performed for each tile image. Alternatively, a plurality of tile images included in the same layer or included in a plurality of layers may be compressed at a time. The image data providing server 2 stores hierarchical data 28 for a plurality of content items. A plurality of sets of hierarchical data 28 are distinguished from each other by identification information identifying the content (hereinafter, referred to as "content ID"). In this embodiment, a content image is exemplified by a two-page spread of a magazine, i.e., left and right pages facing each other when a magazine is opened. The hierarchical data 28 is formed as image data comprising a plurality of layers by generating a scan image of the spread of the magazine and reducing the scan image successively. The image data providing server 2 may store hierarchical data of all spreads of a magazine. In this case, the content ID may comprise a magazine (content) name, page number, etc.

As shown in FIG. 3, the hierarchical structure of the hierarchical data 28 is configured such that the horizontal direction is defined as the X axis, the vertical direction is defined as the Y axis, and the depth direction is defined as the Z axis, thereby building a virtual three-dimensional space. In this hierarchical structure, the X axis and the Y axis define a common coordinate system having the same origin point. Upon deriving the amount of change of a displayed image by referring to an image change command supplied from the input device 20, the information processing device 10 uses the amount of change to derive information specifying a layer and texture coordinates (UV coordinates) in the layer. The combination of the information specifying a layer and the texture coordinates will be referred to as spatial coordinates. Spatial coordinates in a virtual space are used to identify a tile image to be used and to generate an image to be displayed. The information processing device 10 may derive the coordinates of the four corners of a frame image in the virtual space by using the amount of change of a displayed image. The frame coordinates of the four corners will also be referred to as spatial coordinates. The information processing device 10 may drive the coordinates (X, Y) of the center of the frame image in the virtual space and the scaling factor SCALE, as spatial coordinates. Any method for derivation may be employed in the information processing device 10 so long as the device can identify an area in the tile image 38 of a suitable layer that should be used, by referring to an image change command signal supplied from the input device 20. The information processing device 10 transmits the derived spatial coordinates to the image data providing server 2. The image data providing server 2 supplies the tile image identified by the spatial coordinates to the information processing device 10. The image data providing server 2 may predict and identify a tile image expected to be used in the future and provide the identified tile image to the information processing device 10 in advance. In case the entirety of hierarchical data is downloaded by the information processing device 10 from the image data providing server 2, the information processing device 10 may identify an area in the tile image 38 that should be used, by referring to the derived spatial coordinates.

Figure 4:
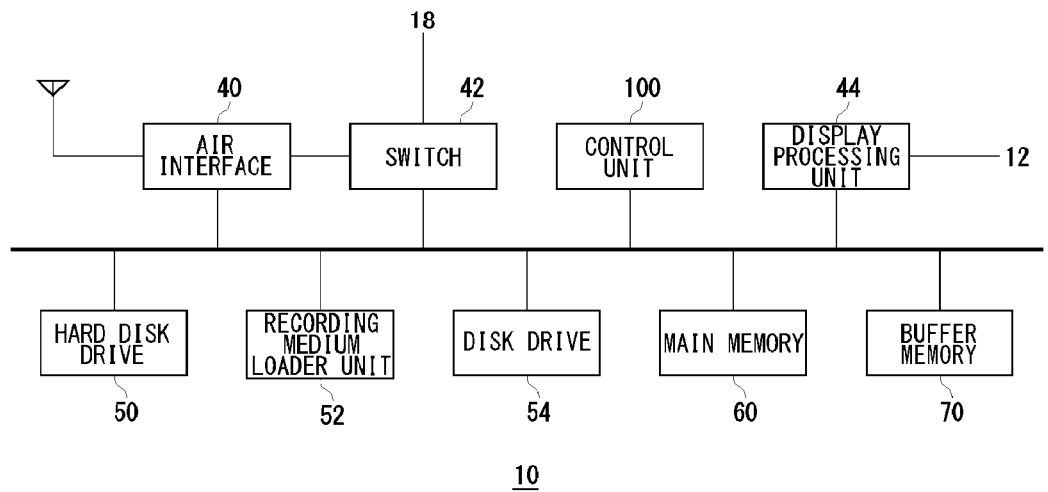
FIG. 4 shows functional blocks of the information processing device.

FIG. 4 shows the functional blocks of the information processing device 10. The information processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the output device 12. In this embodiment, the information processing device 14 may have the same functions as the information processing device 10.

The switch 42 is an Ethernet switch (Ethernet is a registered trademark), a device connected to an external device via a cable or wirelessly so as to transmit and receive data. The switch 42 is connected to the external network 18 so as to receive tile image data from the web image data providing server 2. The switch 42 is connected to the air interface 40. The air interface 40 is connected to the input device 20 using a predefined wireless communication protocol. An image change command signal, which is input by a user through the input device 20, is supplied to the control unit 100 via the air interface 40 and the switch 42.

The hard disk drive 50 functions as an auxiliary storage device for storing data. The compressed image data received via the switch 42 may be stored in the main memory 60. When downloading the entirety of hierarchical data, the hierarchical data may be stored in the hard disk drive 50. If a removable recording medium such as a memory card is mounted, the recording medium loader unit 52 reads data from the removable recording medium. If a read only memory (ROM) disk is mounted, the disk drive 54 drives and recognizes the ROM disk so as to read out data. The ROM disk may be an optical disk, a magneto-optical disk, or the like. The compressed image data may be preinstalled in the hard disk drive 50. The compressed image data may be stored in a removable recording medium or a ROM disk and read into the main memory 60 when a display process is executed.

The control unit 100 is provided with a multi-core CPU. One general-purpose processor core and a plurality of simple processor cores are provided in a single CPU. The general-purpose processor core is referred to as a Power Processing Unit (PPU) and the other processor cores are referred to as Synergistic Processing Units (SPUs).

The control unit 100 is provided with a memory controller connected to the main memory 60 and to the buffer memory 70. The PPU is provided with a register and a main processor as an entity that executes a computation. The PPU efficiently allocates tasks as basic units of processing in applications to be executed to the respective SPUs. The PPU itself may execute a task. The SPU is provided with a register, a sub-processor as an entity that executes a computation, and a local memory as a local storage area. The local memory may be used as the buffer memory 70. The main memory 60 and the buffer memory 70 are storage devices and are formed as random access memories (RAMs). The SPU is provided with a dedicated direct memory access (DMA) controller as a control unit and is capable of high-speed data transfer between the main memory 60 and the buffer memory 70. High-speed data transfer is also achieved between the frame memory and the buffer memory 70. The control unit 100 according to the embodiment achieves high-speed image processing function by operating a plurality of SPU's in parallel. The display processing unit 44 is connected to the output device 12 and outputs an image processing result in accordance with a request from a user.

Figure 5:
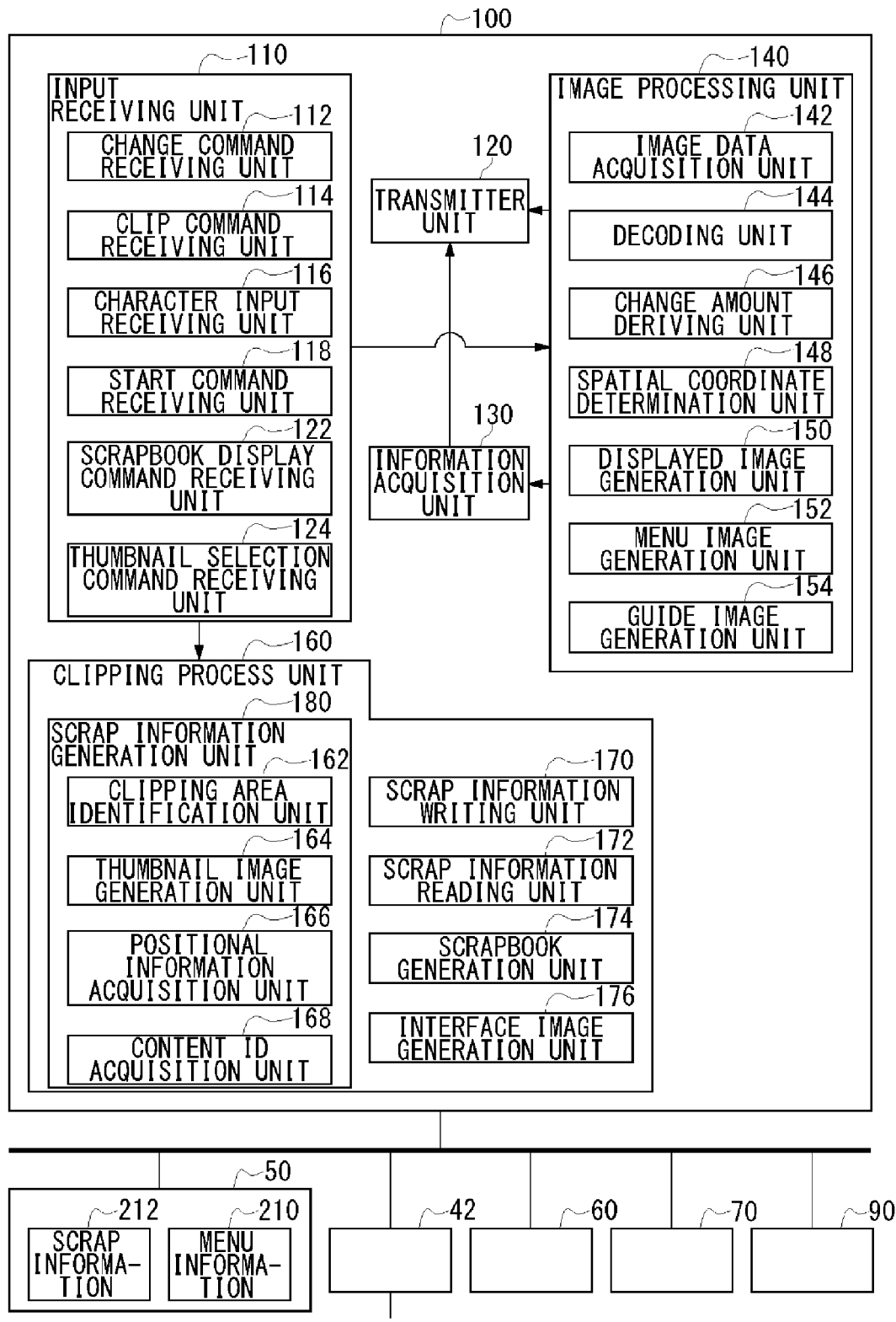
FIG. 5 shows a configuration of the control unit in the information processing device.

FIG. 5 shows the configuration of the control unit 100 in the information processing device 10. The control unit 100 comprises an input receiving unit 110, a transmitter unit 120, an information acquisition unit 130, an image processing unit 140, and a clipping process unit 160. The input receiving unit 110 has the function of receiving control information from the input device 20 and comprises a change command receiving unit 112, a clip command receiving unit 114, a character input receiving unit 116, a start command receiving unit 118, a scrapbook display command receiving unit 122, and a thumbnail selection command receiving unit 124. The image processing unit 140 has the function of generating a displayed image, and, more specifically, the function of processing changes such as enlargement/reduction of a displayed image and scrolling. The image processing unit 140 comprises an image data acquisition unit 142, a decoding unit 144, a change amount deriving unit 146, a spatial coordinate determination unit 148, a displayed image generation unit 150, a menu image generation unit 152, and a guide image generation unit 154. The clipping process unit 160 has the function of executing a clipping process (scrapping process) and comprises a scrap information generation unit 180, a scrap information writing unit 170, a scrap information reading unit 172, a scrapbook generation unit 174, and an interface image generation unit 176. The scrap information generation unit 180 comprises a clipping area identification unit 162, a thumbnail image generation unit 164, a positional information acquisition unit 166, and a content ID acquisition unit 168.

The elements depicted in FIG. 5 as functional blocks for performing various processes are implemented in hardware such as a Central Processing Unit (CPU), memory, or other LSI's, and in software such as a programs etc., loaded into the memory. As describe above, the control unit 100 includes one PPU and a plurality of SPUs. The PPU and the SPUs form one or more of the functional blocks alone or in combination. Therefore, it will be obvious to those skilled in the art that the functional blocks may be implemented in a variety of ways, by hardware only, software only, or a combination thereof.

The information processing device 10 in the information processing system 1 executes a viewer application for viewing registered content. Thumbnail images of the registered content are displayed in a menu screen of the viewer application. Thumbnail images may be still images or moving images. The information processing device 10 stores content IDs for identifying the registered content. To create a menu screen, the information processing device 10 acquires thumbnail images of the registered content from the image data providing server 2. Menu screens may be generated for respective categories. The information processing device 10 acquires thumbnail images necessary in the generated menu screen from the image data providing server 2.

Figure 6:
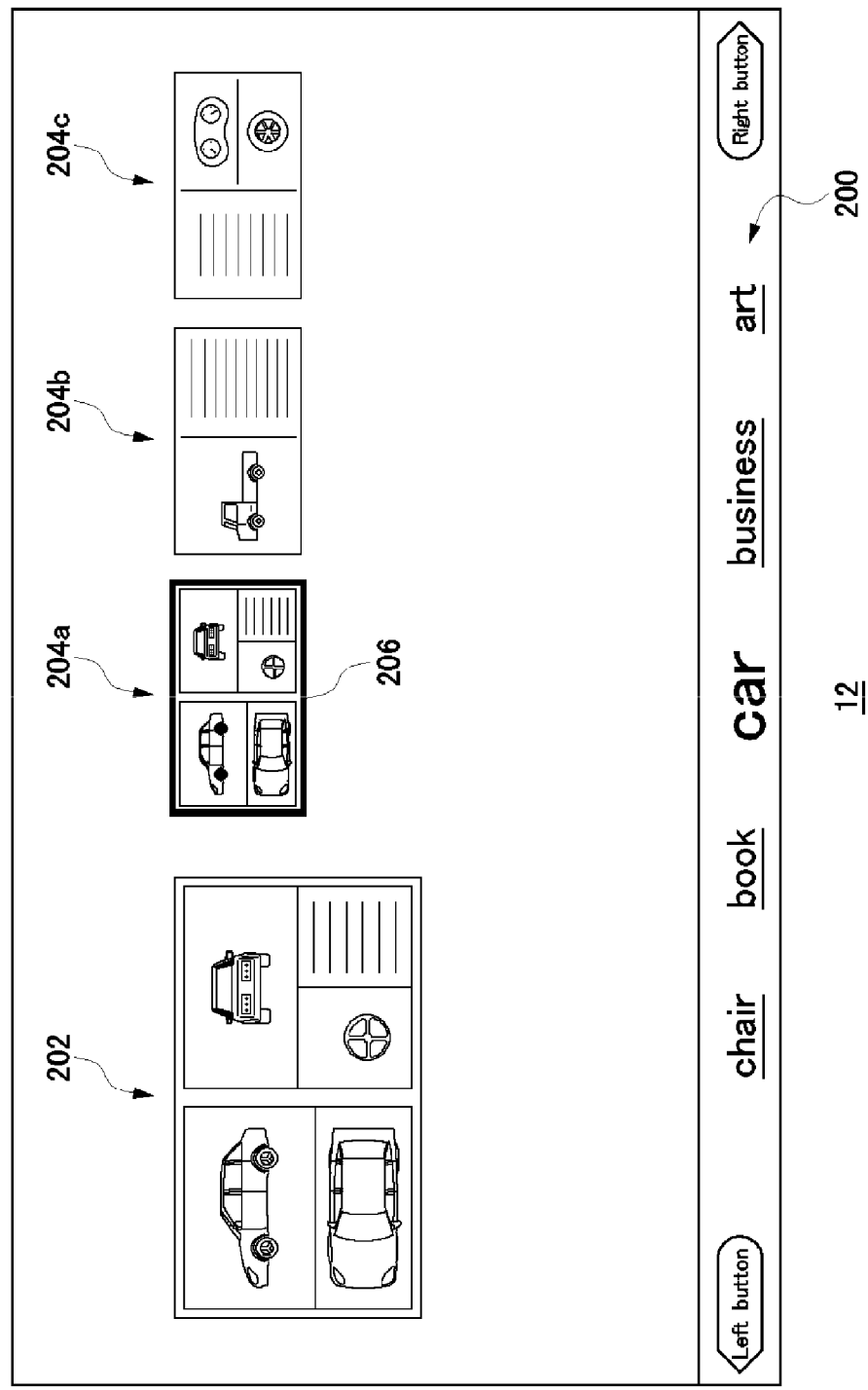
FIG. 6 shows an example of menu screen for controlling a content viewer application.

FIG. 6 shows an example of menu screen for controlling a content viewer application. The menu screen on the display of the output device 12 contains a category selection area 200 for selecting a category of registered content. The user can control the input device 20 to select a category included in the category selection area 200. FIG. 6 shows that a category "car" is selected. Thumbnail images of content registered in association with the category "car" are displayed in registered content display areas 204a, 204b, and 204c. The user can select a thumbnail image by controlling the input device 20 and moving a selection frame 206 accordingly. An enlarged view of the thumbnail image marked by the selection frame 206 is displayed in a selected content display area 202.

The menu screen as described above is generated by a menu image generation unit 152. The hard disk drive 50 stores menu information 210 necessary to generate a menu image. The menu information 210 includes a category name, a content ID mapped to the category, etc. and is provided from the image data providing server 2. When a category is selected in the category selection area 200, the menu image generation unit 152 reads the content ID mapped to the selected category from the menu information 210. The transmitter unit 120 transmits the read content ID to the image data providing server 2 via the switch 42. The image data providing server 2 provides the thumbnail image mapped to the content ID to the information processing device 10. When the image data acquisition unit 142 receives the thumbnail image, the menu image generation unit 152 pastes the thumbnail image in the registered content display area 204.

When a thumbnail selection command receiving unit 124 receives a command to select a thumbnail image displayed in the registered content display area 204, i.e., a command to move the selection frame 206, the menu image generation unit 152 moves the selection frame 206 between the registered content display areas 204 and displays an enlarged view of the selected thumbnail image in the selected content display area 202. The enlarged view may be provided from the image data providing server 2. When the user presses the circle button 22 of the input device 20 in the menu screen shown in FIG. 6, the content image shown in the selected content display area 202 starts to be displayed.

Figure 7:
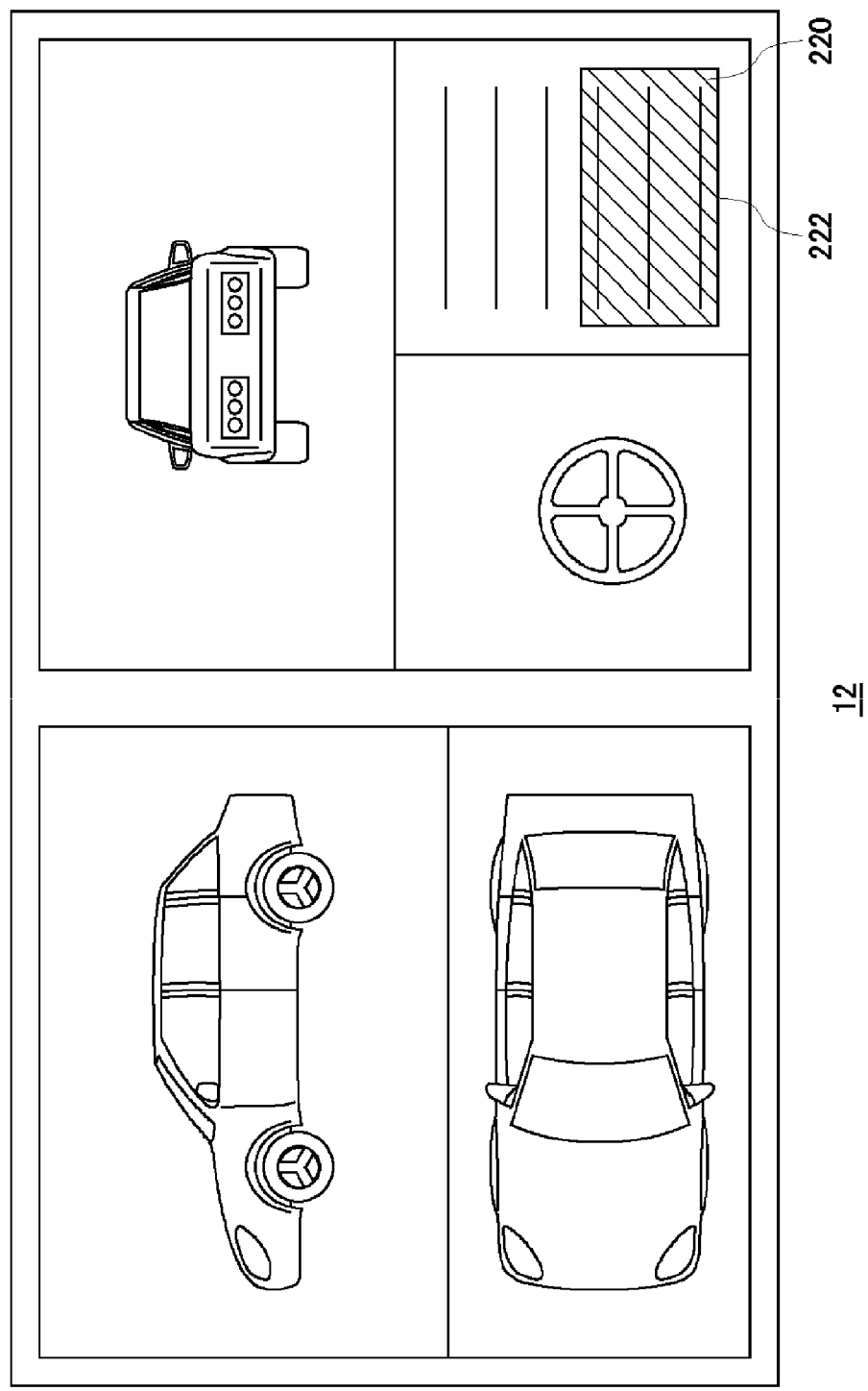
FIG. 7 shows an example of displayed image displayed on an output device when a content image is started to be displayed.

FIG. 7 shows an example of displayed image displayed on the output device 12 when the content image is started to be displayed. When the user presses the circle button 22 in the menu screen shown in FIG. 6, the start command receiving unit 118 receives the control information as a command to start displaying the image. The image data acquisition unit 142 acquires initial image data of the content image from the image data providing server 2. The image data providing server 2 stores one or more tile images for generating the initial image in the information processing device 10 in advance. When a request to acquire the initial image is transmitted from the transmitter unit 120 along with the content ID, the image data providing server 2 transmits the tile image forming the initial image identified by the content ID to the information processing device 10. When the image data acquisition unit 142 acquires the tile image, the displayed image generation unit 150 uses the tile image to generate the initial image shown in FIG. 7.

When the user controls the analog stick 27 of the input device 20, an image change command is transmitted to the information processing device 10. The change command receiving unit 112 receives the image change command signal requesting a change in the image displayed on the display.

The change amount deriving unit 146 derives the amount of change in the displayed image requested to be displayed, in accordance with the change command signal. The amount of change in the displayed image is the amount of frame-by-frame movement of the displayed image in the upward, downward, leftward, rightward, and depth directions in the virtual three-dimensional space of hierarchical data. The spatial coordinate determination unit 148 determines the spatial coordinates (positional information) of the current frame moved by the amount of movement as derived, by referring to the spatial coordinates of the previous frame. The spatial coordinates are positional information (X, Y, SCALE) which is identified by coordinates (X, Y) of the center of the frame image and the scaling factor (SCALE). The change amount deriving unit 146 derives the amount of change (ΔX, ΔY, ΔSCALE) by referring to the change command signal, and the spatial coordinate determination unit 148 determines the positional information of the current frame (X, Y, SCALE) by adding the amount of change (ΔX, ΔY, ΔSCALE) to the positional information of the previous frame (Xprev, Yprev, SCALEprev). As described before, the spatial coordinates may be determined by other parameters.

The transmitter unit 120 transmits the spatial coordinates determined by the spatial coordinate determination unit 148 to the image data providing server 2. When the image data providing server 2 receives the spatial coordinates, the server 2 determines whether it is necessary to change the tile image to generate the displayed image in the information processing device 10. When it is necessary to change a tile image, the image data providing server 2 provides the tile image to the information processing device 10. When the image data acquisition unit 142 acquires the tile image, the unit 142 stores the tile image in the main memory 60. The decoding unit 144 reads the tile image used to generate the displayed image from the main memory 60 and decodes it, and stores the decoded image in the buffer memory 70. The displayed image generation unit 150 uses the tile image stored in the buffer memory 70 to generate the displayed image according to the positional information, and stores the generated image in the frame memory 90.

The guide image generation unit 154 generates a guide image 220 to be displayed in a bottom right area of the screen. The guide image 220 is an indicator identifying the position of the area of the displayed image in the content image as a whole. The content image as a whole according to this embodiment is a whole image of a two-page spread of a magazine and an image formed by all tile images included in a single layer in the hierarchical data. The guide image generation unit 154 identifies the position of an area of the displayed image in the whole image by referring to the spatial coordinates of the frame and generates the guide image 220 showing the area. In the example of FIG. 7, the displayed image is identical to the whole content image so that the guide image 220 overlaps a content frame 222. The content frame 222 is a reduced version of the outer frame of the whole content image. The guide image generation unit 154 represents the relation between the outer frame of the whole content image and the area of the displayed image by the relation between the content frame 222 and the guide image 220. The guide image generation unit 154 supplies the generated image to the display processing unit 44. The display processing unit 44 superimposes the guide image generated by the guide image generation unit 154 over the displayed image generated by the displayed image generation unit 150 so as to generate the frame image.

As described above, by using the displayed image generation unit 150 to generate a displayed image, the information processing device 10 is capable of enlarging, reducing, or scrolling the displayed image at a high speed and presenting smooth variation in the image to the user. By using the guide image generation unit 154 to generate a guide image, the user can easily understand the position of the displayed image in the content image as a whole.

Figure 8:
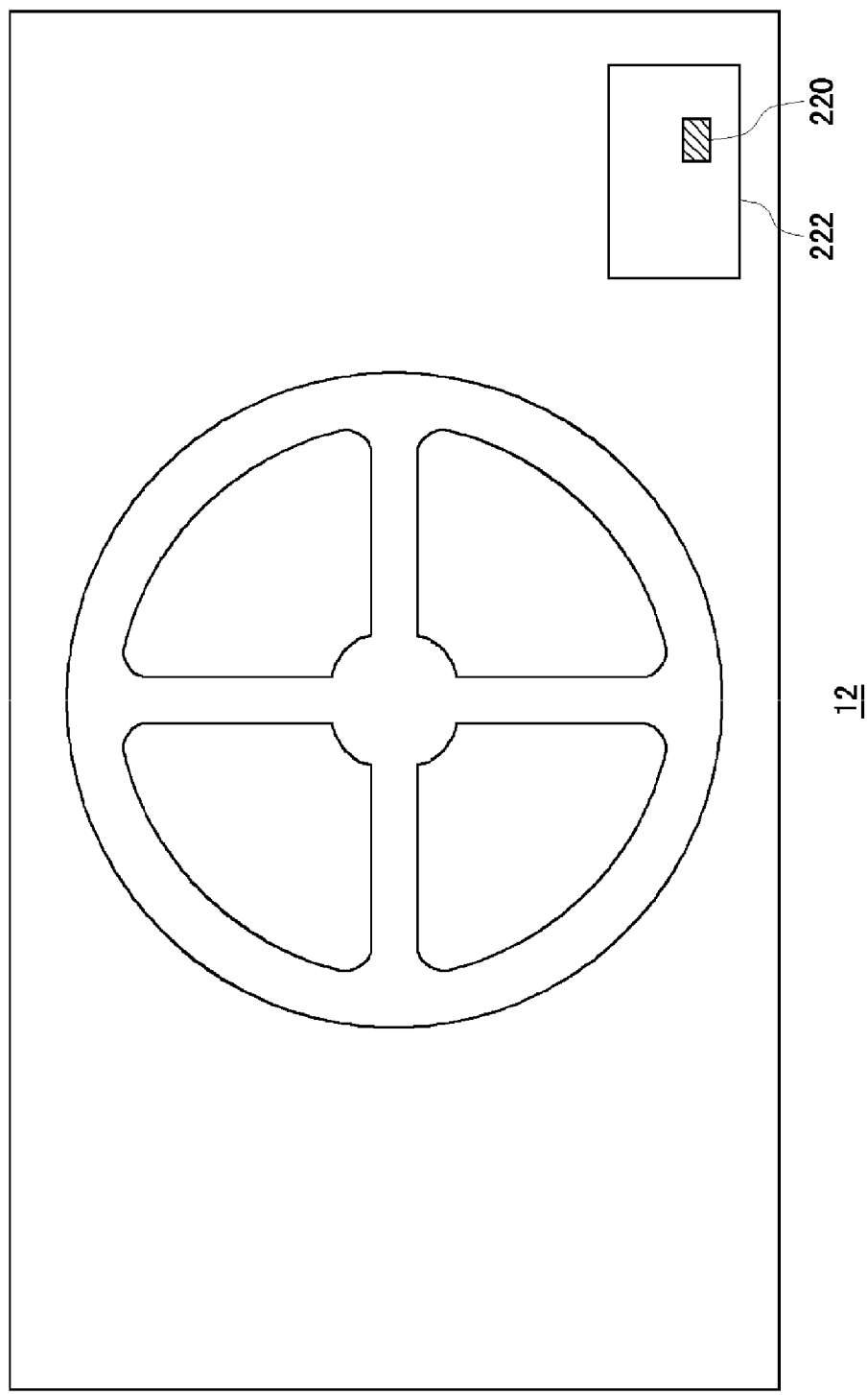
FIG. 8 shows an exemplary displayed image showing an enlarged view of the initial image.

FIG. 8 shows an exemplary displayed image showing an enlarged view of the handle in the initial image shown in FIG. 7. The guide image generation unit 154 identifies the position of the area of the displayed image in the whole image by referring to the spatial coordinates of the frame and places the guide image 220 in the content frame 222.

The information processing device 10 has the function of clipping (scrapping) the whole or part of the displayed image displayed on the output device 12. The whole of the displayed image means the entirety of the frame image displayed on the output device 12, and part of the displayed image means part of the frame image. The clipping process is executed by the clipping process unit 160. In a clipping process, the whole or part of the displayed image can be scrapped when the user presses a predetermined button (e.g., the circle button 22) of the input device 20 while the content image is being displayed. A description will now be given of a case where the user presses the circle button 22 in the display screen shown in FIG. 8.

The clip command receiving unit 114 receives the information from the input device 20 generated by controlling the circle button 22 as a command to clip the whole or part of the displayed image from the whole content image. In this embodiment, the clip command receiving unit 114 receives the information generated by controlling the circle button 22 as a command to clip the whole of the displayed image. In this example, the image of a handle shown in FIG. 8 is clipped. Alternatively, the user may be allowed to define a rectangular area in the displayed image from which to clip the image.

When the clip command receiving unit 114 receives a command to clip the image, the scrap information generation unit 180 generates scrap information that identifies the image to be clipped. The clipping area identification unit 162 in the scrap information generation unit 180 identifies the area to be clipped from the whole of the content image in response to the command to clip the image. As described already, the whole of the displayed image is identified as the area to be clipped. The thumbnail image generation unit 164 generates a thumbnail image corresponding to the identified area. The thumbnail image generation unit 164 may reduce the clipped displayed image to generate the thumbnail image. The positional information acquisition unit 166 acquires positional information identifying the position of the identified area in the image as a whole. The positional information (X, Y, SCALE) indicates the position of an area in the hierarchical image data producing the displayed image. The positional information may be used to generate the guide image 220 when the entirety of the displayed image is clipped. When the user defines a rectangular area identifying an area to be clipped from the displayed image, the positional information acquisition unit 166 derives and acquires the positional information of the rectangular area by computation. Thus, in this embodiment, the positional information acquisition unit 166 acquires the spatial coordinates of the displayed image as positional information. Further, the content ID acquisition unit 168 acquires the identification information (content ID) of the content image. The scrap information writing unit 170 maps the acquired content ID, the generated thumbnail image, and the acquired positional information to each other and stores the mapped information in the hard disk drive 50 as scrap information.

Figure 9:
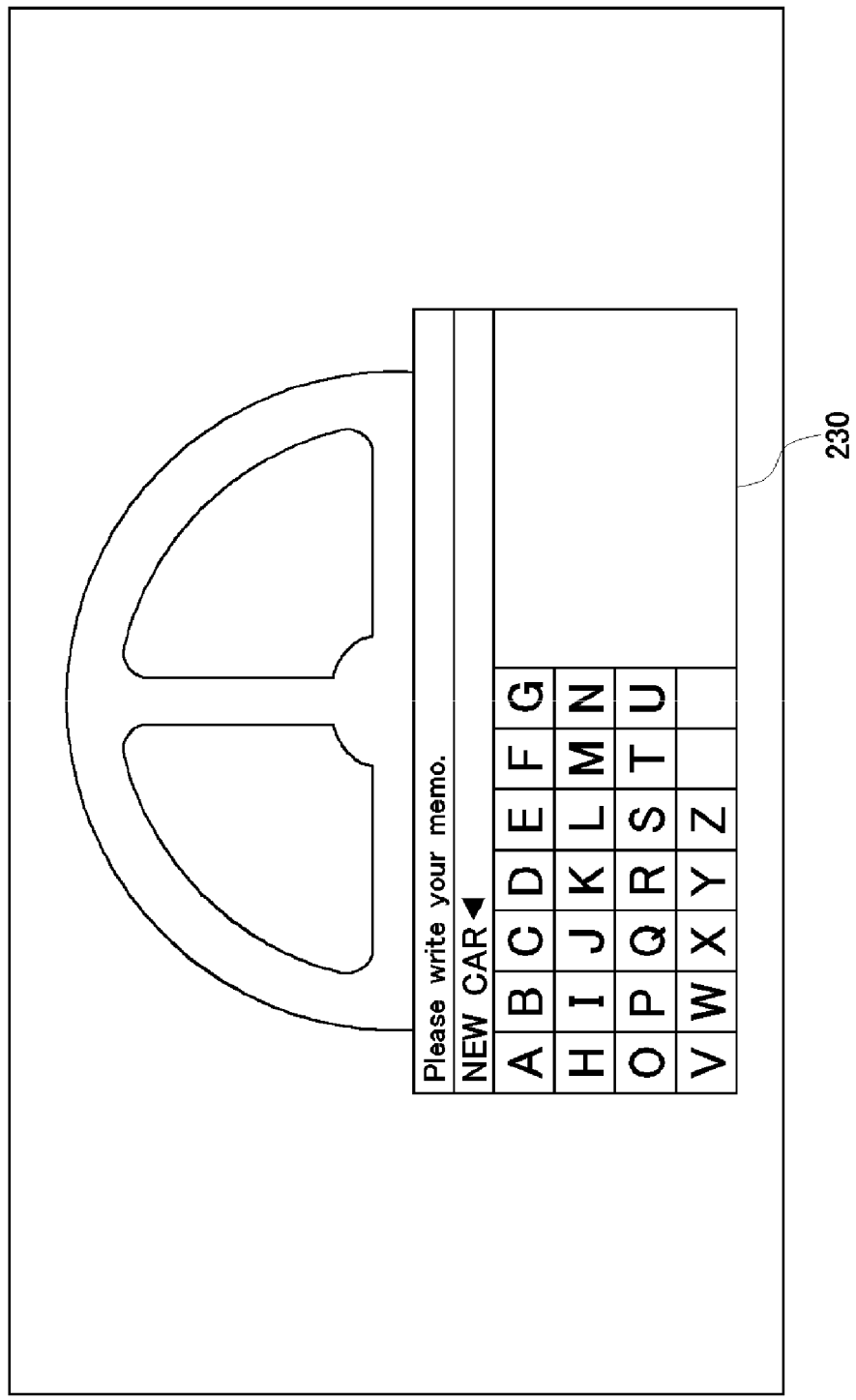
FIG. 9 shows an example of an interface image for entering a note attached to a thumbnail image.

FIG. 9 shows an example of an interface image for entering a note attached to a thumbnail image. When the clip command receiving unit 114 receives a command to clip the image, the scrap information generation unit 180 generates scrap information, and an interface image generation unit 176 generates an interface image 230 for entering character information attached to the scrap image. In the interface image 230, the user can select a character (e.g., an alphabet) by using the input device 20 and enter a character string to be attached to the scrap image. In the illustrated example, a character string "NEWCAR" is entered. The character string entered is mapped to the thumbnail image and stored in the hard disk drive 50 as part of the scrap information.

Figure 10:
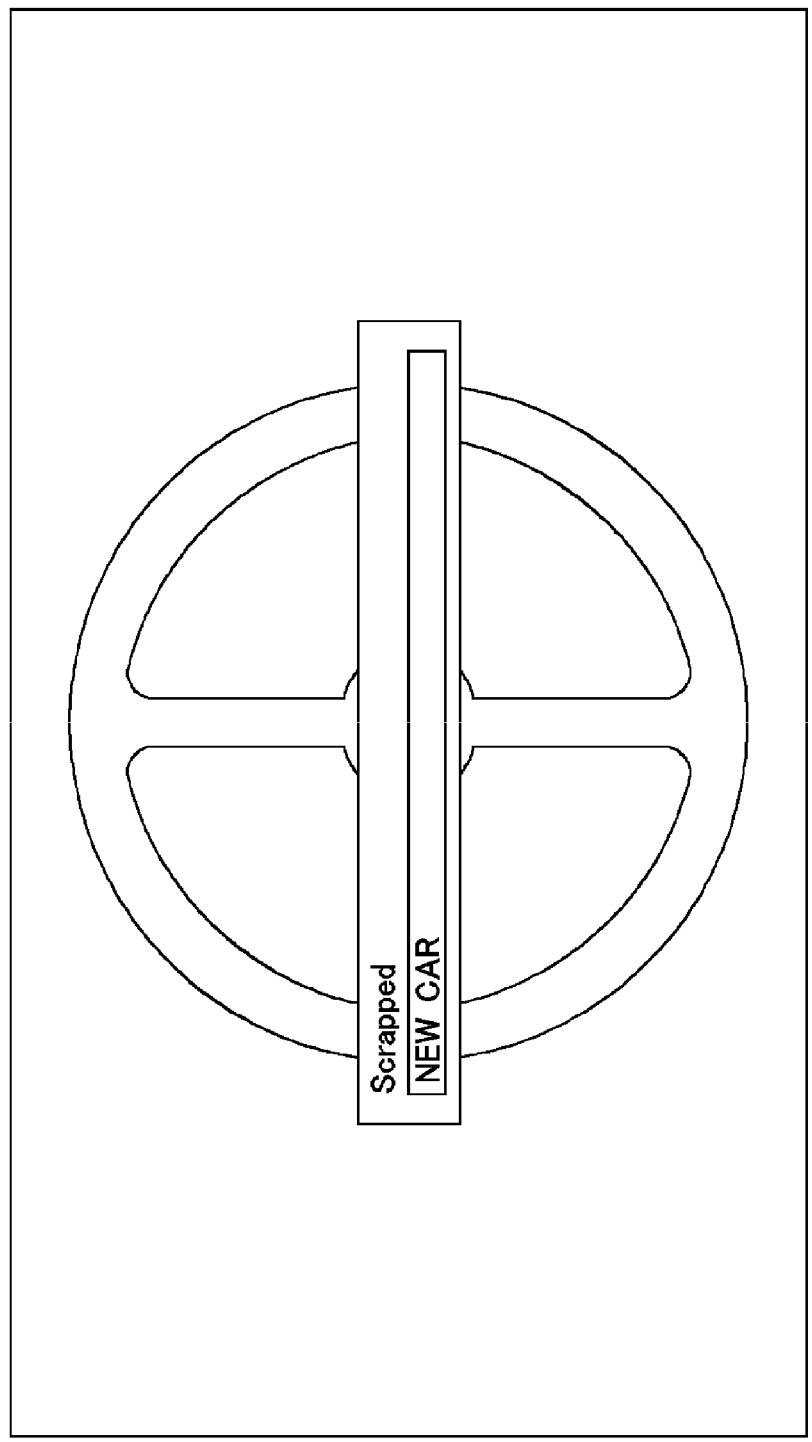
FIG. 10 shows an exemplary screen showing the end of a clipping process.

FIG. 10 shows an exemplary screen showing the end of a clipping process. The scrap information writing unit 170 stores the content ID, the thumbnail image, the positional information, and the character string in the hard disk drive 50 as scrap information 212. The scrap information writing unit 170 generates scrap information 212 each time a clip command is generated and stores the information in the hard disk drive 50.

The user can view a list of scrapped content. While a content viewer application is being executed, the user causes a list of thumbnail images stored in the hard disk drive 50 to be displayed by pressing a predefined button (e.g., the square button 24) of the input device 20. By representing a list of scrapped content using images, an interface is presented that allows the user to get a grasp of the content intuitively. A description will now be given of an example where the user presses the square button 24 in the display screen shown in FIG. 7. Transition to a list view of scrap images may occur from the display screen shown in FIG. 8.

Figure 11:
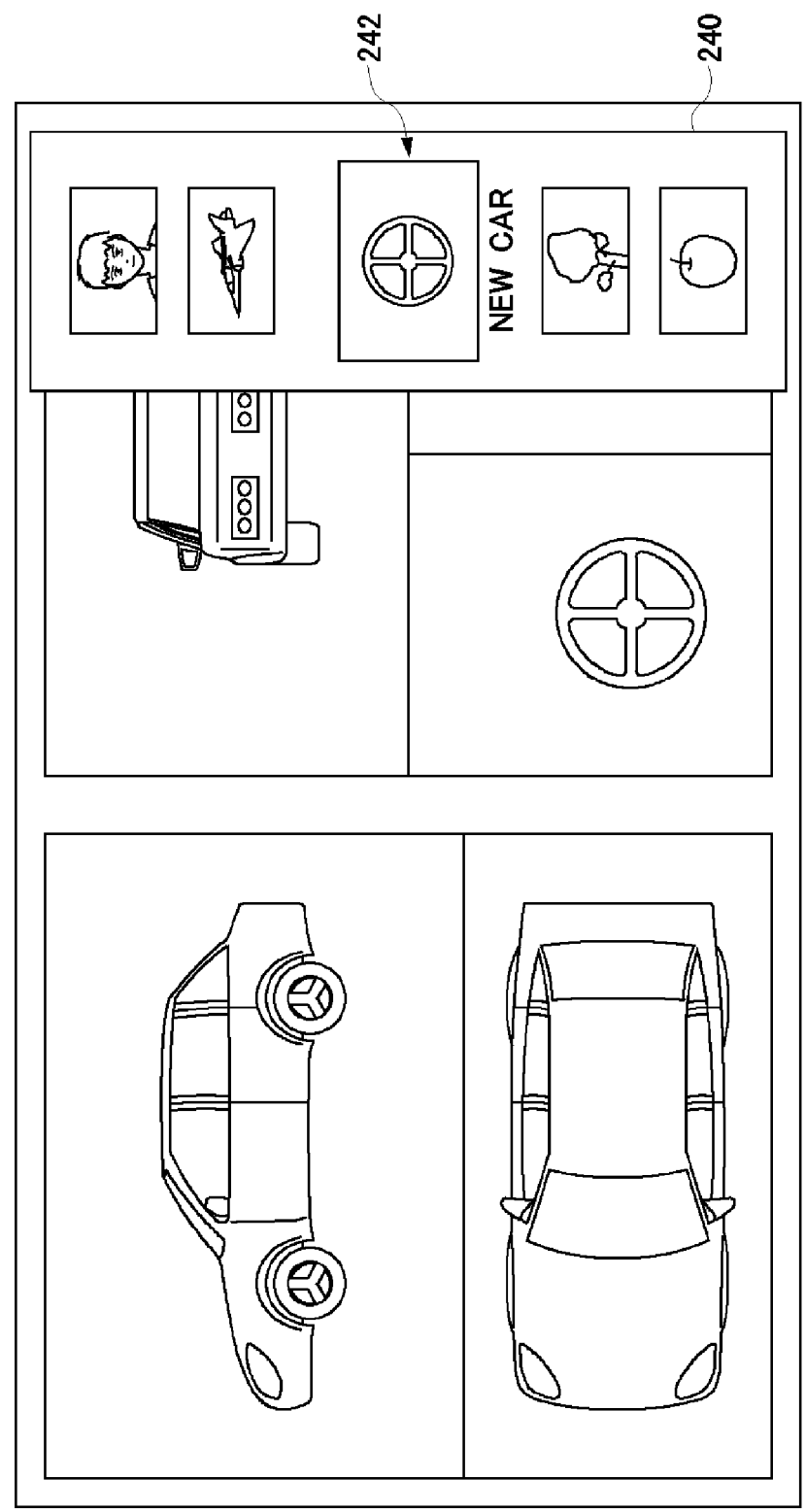
FIG. 11 shows an exemplary screen showing a scrapbook.

FIG. 11 shows an exemplary screen showing a scrapbook 240. The scrapbook display command receiving unit 122 receives the information from the input device 20 generated by controlling the square button 24 as a command to display a virtual scrapbook. When the scrapbook display command receiving unit 122 receives a command to display a scrapbook, the scrap information reading unit 172 reads out the scrap information stored in the hard disk drive 50. In this case, the scrap information reading unit 172 reads out the thumbnail image and the attached character string of the scrap information. The scrapbook generation unit 174 uses the read thumbnail image to generate a scrapbook 240 that presents thumbnail images for user selection and supplies the scrapbook 240 to the display processing unit 44. The display processing unit 44 superimposes the scrapbook 240 generated by the scrapbook generation unit 174 on the displayed image generated by the displayed image generation unit 150, thereby generating a frame image. The scrapbook 240 is configured such that the thumbnail images are moved up and down by user control of the input device 20. A selection area 242 is defined at the vertical center of the scrapbook 240. When the user presses a predefined button, the content image corresponding to the thumbnail image located in the selection area 242 is displayed.

In the example shown in FIG. 11, the thumbnail image of the handle marked by the character string "NEWCAR" is displayed in the selection area 242. The thumbnail image is clipped in the clipping process shown in FIG. 10. When the user presses a predefined button (e.g., the circle button 22) in this state, the thumbnail selection command receiving unit 124 receives the control information as a command to select the thumbnail image displayed in the selection area 242. The selection command is supplied to the image data acquisition unit 142.

When the image data acquisition unit 142 receives the command to select the thumbnail image, the unit 142 reads the scrap information 212 mapped to the thumbnail image from the hard disk drive 50. The transmitter unit 120 transmits the content ID and the position information thus read to the image data providing server 2. The image data providing server 2 provides the tile image identified by the content ID and the positional information to the information processing device 10. In this process, the image data providing server 2 may provide the initial image data of the content to the information processing device 10.

When the image data acquisition unit 142 acquires the tile image, the unit 142 stores the image in the main memory 60. The decoding unit 144 reads the tile image used to generate a displayed image from the main memory 60 and stores the decoded image in the buffer memory 70. The displayed image generation unit 150 uses the tile image stored in the buffer memory 70 to generate a displayed image and supplies the image to the frame memory 90. In this way, the clipped image corresponding to the thumbnail image is displayed on the output device 12 at a higher resolution.

Before displaying the image, the displayed image generation unit 150 may generate an initial image using initial image data. Since an initial image represents the content image as a whole, the user can understand the entirety of the content easily by seeing the initial image. The initial image may be displayed for a short duration of about one second. It is favorable to enlarge the image and make a smooth transition to the clipped image, after the initial image is displayed. If the clipped image is identical to the initial image, the initial image may continue to be displayed.

Figure 12:
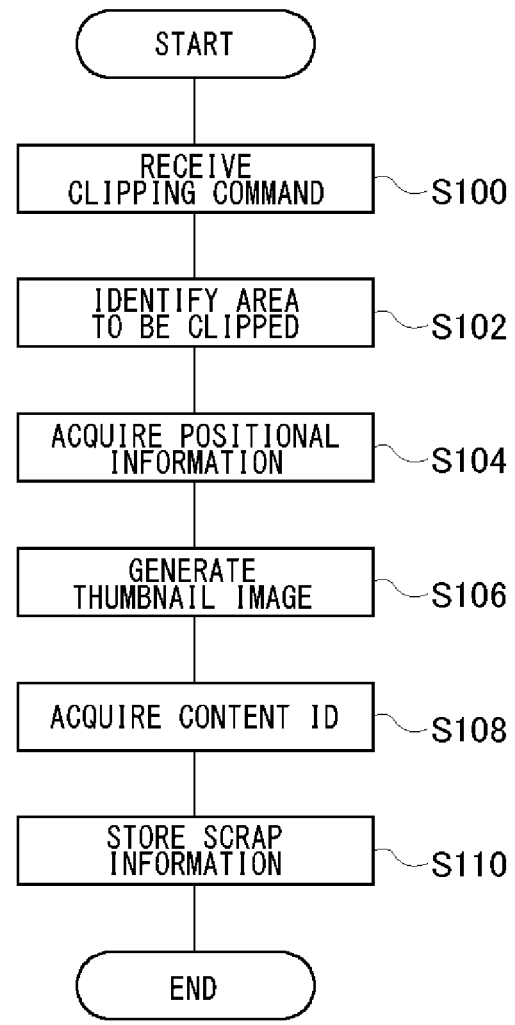
FIG. 12 is a flowchart showing a clipping process.

FIG. 12 is a flowchart showing a clipping process. When the clip command receiving unit 114 receives a clip command (S100), the clipping area identification unit 162 identifies an image area to be clipped from the entirety of the content image according to the clip command (S102). In this embodiment, the entire area of the displayed image is identified as an area to be clipped. The positional information acquisition unit 166 acquires the positional information identifying the position of the identified area in the whole content image (S104). The positional information may be spatial coordinates used to generate a displayed image. The spatial coordinates include information related to the scaling factor. The thumbnail image generation unit 164 generates a thumbnail image corresponding to the identified area (S106). The content ID acquisition unit 168 acquires the identification information (content ID) of the content image (S108). The scrap information writing unit 170 maps the acquired content ID, the generated thumbnail image, and the acquired positional information to each other and stores the mapped information in the hard disk drive 50 as scrap information (S110).

As described above, the information processing device 10 executes a clipping process in a way that the user can intuitively recognize the content. In a real world, people have conversation with friends, viewing the same magazine or newspaper, so as to share their impression. However, it is often difficult to arrange the schedule. It is particularly difficult to meet with friends at remote locations. The information processing system 1 addresses the issue by providing an environment to share information in a virtual space on a network.

In one example, information can be shared with other users (e.g., friends) by supplying scrap information from the information processing device 10 to the information processing device 14. The information acquisition unit 130 acquires scrap information 212 from the hard disk drive 50. The transmitter unit 120 transmits the scrap information 212 to a specific information processing device 14. In this process, the transmitter unit 120 may transmit only the content ID and the positional information among the scrap information. The information processing device 14 has the same image processing function as the information processing device 10. By receiving the content ID and the positional information, the information processing device 14 can access the image data providing server 2 and display the content image accordingly. The information processing device 14 at least comprises a receiver unit for receiving a content ID and positional information, a transmitter unit for transmitting the received content ID and positional information to the image data providing server 2, an image data acquisition unit for acquiring the image data provided by the image data providing server 2, and a displayed image generation unit for generating a displayed image using the acquired image data in accordance with the position information. Thus, a plurality of users can share scrap information in the information processing system 1.

For example, the transmitter unit 120 may transmit the scrap information 212 to the information processing device 14 using the messaging function used in a social network service (SNS) etc. The information processing device 14 can let the user know that a message is received even while a game application is being executed, by displaying an icon on the output device 16 to indicate the reception of a message. Thus user can open the message at a desired point of time and acquire the scrap information 212 transmitted from the information processing device 10. Thus, the user of the information processing device 14 can share the information scrapped by the user of the information processing device 10. The information processing device 14 initially displays the clipped image identified by the scrap information 212 on the output device 16. As already described, the information processing device 14 has the same image processing function as the information processing device 10 and allows the user to enlarge, reduce, or move the displayed image as desired.

The information processing device 10 may store the scrap information in the storage server 3. For example, the information processing device 14 may access the storage server 3 according to a predetermined timing schedule and acquire the scrap information generated by the information processing device 10. Once the scrap information is stored in the storage server 3, the information processing device 14 can acquire the scrap information whenever it is desired. Thus, a highly convenient environment is implemented.

In one alternative, the information processing device 10 may supply, in real time, the information processing device 14 with information on the image as displayed in the information processing device 10. This allows the information processing device 14 to display substantially the same image as displayed in the information processing device 10. To achieve synchronization, the information processing system 1 uses a chat system.

In the information processing system 1 according to the embodiment, the information processing device 10 as a host device generates a virtual room for chatting (chat room) in the network server 4. The host user of the information processing device 10 designates a guest user to be invited to the chat room and transmits an invitation message from the information processing device 10 to the information processing device 14 of the guest user. When the guest user accepts the invitation to the chat room via the information processing device 14 and enters the chat room, a chat system is built between users entering the chat room.

Figure 13:
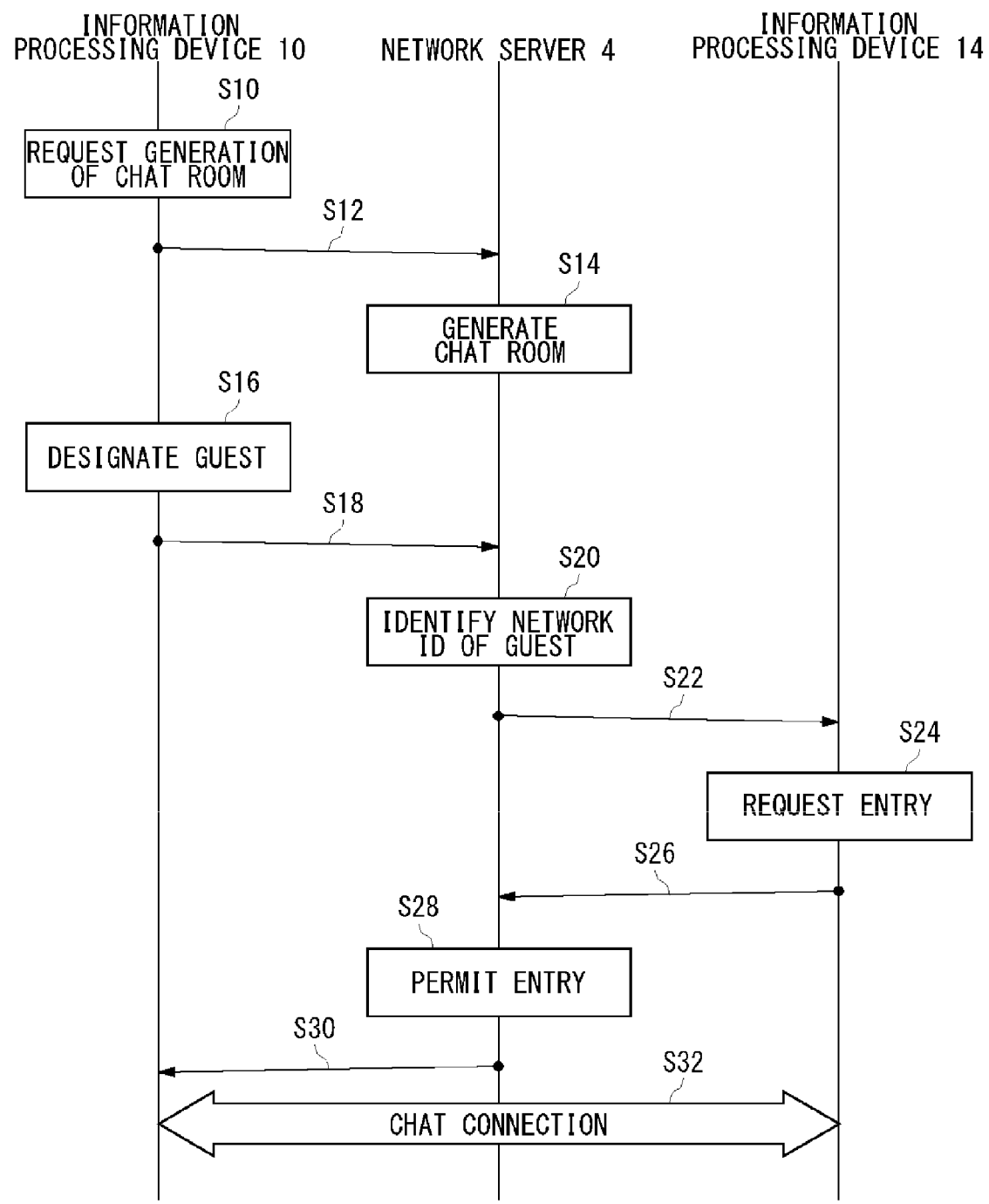
FIG. 13 shows a sequence of steps for establishingconnection for a chat.

FIG. 13 shows a sequence of steps for establishing connection for chatting. The network server 4 maps the network ID's, the address information, and the user ID's of the information processing devices participating in the information processing system 1 to each other and manages the mapped information. First, the information processing device 10 generates a request to generate a chat room (S10). The request to generate a chat room is transmitted to the network server 4 (S12), whereupon the network server 4 generates a chat room (S14). The information processing device 10 stores the user ID's of a plurality of other users. When a guest user to be invited to the chat room is selected (S16), the information processing device 10 transmits the user ID of the guest user and an invitation message to the network server 4 (S18).

The network server 4 identifies the network ID of the information processing device 14 of the guest user by referring to the user ID of the guest user (S20). The network server 4 forwards the invitation message to the address mapped to the network ID (S22). The information processing device 14 generates a request for entry indicating acceptance of the invitation (S24) and transmits the request to the network server 4 (S26). In response, the network server 4 permits entry of the guest user into the chat room (S28) and transmits the address information of the information processing device 14 to the information processing device 10 (S30). The information processing device 10 accesses the information processing device 14 based on the transmitted address information and establishes connection for chatting (S32). This allows the host user of the information processing device 10 and the guest user of the information processing device 14 to chat.

By performing similar steps in the information processing device 10 in relation to other information processing devices, a plurality of users can enter the chat room. The address information of all users entering the chat room is communicated to the respective information processing devices 14. The information processing devices 10 and 14 transmit stream data or text data to entering users other than their host users. This allows users entering the chat room to chat with each other.

The information processing device 10 in the information processing system 1 according to the embodiment attaches information related to a displayed image to a chat message. The information related to a displayed image includes the ID of the content displayed and positional information (spatial coordinates). The information processing device 14 receiving the information accesses the image data providing server 2 to acquire a necessary tile image and generate a displayed image. This allows the information processing device 14 to generate the displayed image in synchronization with the information processing device 10. Accordingly, the users can feel as if they are viewing the content together, sharing the same space.

Absent any response to the invitation message, the information processing device 10 may use the messaging function to transmit the scrap information 212 to the information processing device 14. This allows the information processing device 14 to acquire the scrap information 212 by opening the message. The forthcoming schedule of opening a chat room may be written in the message to prompt the user of the information processing device 14 to commit to view the content together.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment, hierarchical data is used to generate a displayed image. By using image data comprising a plurality of layers, it is possible to make smooth transition between displayed images. However, the information processing device 10 may only use image data comprising a single layer to generate a displayed image.

The clipping process unit 160 may organize the scrap information 212 stored in the hard disk drive 50 periodically. For example, it is favorable to delete the scrap information 212 of the content already deleted in the image data providing server 2. Therefore, the clipping process unit 160 may periodically inquire of the image data providing server 2 whether the content ID included in the scrap information 212 is found in the image data providing server 2. If the associated content is already deleted, the scrap information 212 identified by the content ID is deleted. In this way, the scrap information 212 can be organized.

DESCRIPTION OF THE REFERENCE NUMERALS

1 . . . information processing system, 2 . . . image data providing server, 3 . . . storage server, 4 . . . network server, 10 . . . information processing device, 12 . . . output device, 14 information processing device, 16 . . . output device, 18 . . . network, 20 . . . input device, 100 . . . control unit, 110 . . . input receiving unit, 112 change command receiving unit, 114 . . . clip command receiving unit, 116 character input receiving unit, 118 . . . start command receiving unit, 120 . . . transmitter unit, 122 . . . scrapbook display command receiving unit, 124 . . . thumbnail selection command receiving unit, 130 . . . information acquisition unit, 140 . . . image processing unit, 142 . . . image data acquisition unit, 144 decoding unit, 146 . . . change amount deriving unit, 148 spatial coordinate determination unit, 150 . . . displayed image generation unit, 152 . . . menu image generation unit, 154 . . . guide image generation unit, 160 . . . clipping process unit, 162 . . . clipping area identification unit, 164 . . . thumbnail image generation unit, 166 . . . positional information acquisition unit, 168 . . . content ID acquisition unit, 170 . . . scrap information writing unit, 172 . . . scrap information reading unit, 174 . . . scrapbook generation unit, 176 . . . interface image generation unit, 180 . . . scrap information generation unit The present invention is applicable to a technical field of processing image data.

The invention claimed is:

1. An information processing device adapted to display a whole image or a part of the whole image on a display, comprising:
a first receiving unit configured to receive a change command to change the displayed image, wherein said displayed image comprises a plurality of hierarchical layers, each layer comprises one or more tile images, and each layer corresponds to at least one of a different resolution and scale of said displayed image, said hierarchical layers define a virtual three-dimensional space of hierarchical image data,
wherein said information processing device downloads and acquires said tile images necessary to generate said displayed image, in accordance with the scale, resolution, and movement indicated in the change command, from an image data providing server;
an image processing unit configured to generate the displayed image corresponding to the whole image or the part of the whole image, in accordance with the change command to change the displayed image;
a second receiving unit configured to receive a clip command; and
a clipping process unit configured to clip the displayed image in accordance with the clip command,
wherein the clipping process unit comprises:
a clipping area identification unit configured to identify an area in the displayed image to be clipped in accordance with the clip command;
a thumbnail image generation unit configured to generate a thumbnail image of a clipped image;
a positional information acquisition unit configured to acquire positional information identifying the position of the identified area in the whole image; and
a storage unit configured to store the thumbnail image and the positional information, mapping the thumbnail image and the positional information to each other,
wherein said information processing device is configured to share image content, including said clipped image content, with another information processing device configured with identical image processing functionality.

2. The information processing device according to claim 1, wherein the change command is a request for enlargement, reduction, or movement of the displayed image.

3. The information processing device according to claim 1, wherein the clipping process unit further comprises an identification information acquisition unit configured to acquire identification information identifying the displayed image when the second receiving unit receives the clip command.

4. The information processing device according to claim 3, further comprising: a transmitter unit configured to transmit over a network the identification information and the positional information to another information processing device or a storage server.

5. The information processing device according to claim 1, wherein the clipping process unit further comprises a scrapbook generation unit configured to generate a scrapbook for presenting a thumbnail image for user selection.

6. The information processing device according to claim 1, further comprising:
a third receiving unit configured to receive a command to select a thumbnail image displayed on the display,
wherein the image processing unit generates the displayed image based on the positional information mapped to the selected thumbnail image.

7. The information processing device according to claim 1,
wherein the image processing unit generates the displayed image by using at least one tile image that forms a part of hierarchical image data representing the whole image with tile images of a plurality of resolutions, and wherein the positional information acquisition unit acquires information related to a scaling factor of the displayed image as positional information.

8. The information processing device according to claim 7, wherein the image processing unit acquires the tile image over a network from an image data providing server.

9. An information processing device adapted to display a whole image or a part of the whole image on a display, comprising:

a first receiving unit configured to receive a change command to change the displayed image, wherein said displayed image comprises a plurality of hierarchical layers, each layer comprises one or more tile images, and each layer corresponds to at least one of a different resolution and scale of said displayed image, said hierarchical layers define a virtual three-dimensional space of hierarchical image data, wherein said information processing device downloads and acquires said tile images necessary to generate said displayed image, in accordance with the scale, resolution, and movement indicated in the change command, from an image data providing server;

a positional information determination unit configured to determine positional information identifying the position of the displayed image in relation to the whole image, in accordance with the change command;

a displayed image generation unit configured to generate the displayed image in accordance with the determined positional information; and a transmitter configured to transmit the determined positional information to another information processing device with identical image processing functionality.

10. An information processing system in which a first information processing device and a second information processing device are connected over a network, wherein the first information processing device comprises:

a first receiving unit configured to receive a change command to change a displayed image, wherein said displayed image comprises a plurality of hierarchical layers, each layer comprises one or more tile images, and each layer corresponds to at least one of a different resolution and scale of said displayed image, said hierarchical layers define a virtual three-dimensional space of hierarchical image data, wherein said information processing device downloads and acquires said tile images necessary to generate said displayed image, in accordance with the scale, resolution, and movement indicated in the change command, from an image data providing server;

a positional information determination unit configured to determine positional information identifying the position of the displayed image in relation to a whole image, in accordance with the change command;

a displayed image generation unit configured to generate the displayed image corresponding to the whole image or the part of the whole image, in accordance with the determined positional information; and a transmitter unit configured to transmit the determined positional information to the second information processing device which has the same image processing functionality as the first image processing device, and wherein the second information processing device comprises:

a receiver unit configured to receive the positional information; and a displayed image generation unit configured to generate the displayed image in accordance with the received positional information.

11. A non-transitory, computer readable storage medium containing a program executable by a computer, the program comprising:

a module configured to receive a command to change a displayed image, wherein said displayed image comprises a plurality of hierarchical layers, each layer comprises one or more tile images, and each layer corresponds to at least one of a different resolution and scale of said displayed image, said hierarchical layers define a virtual three-dimensional space of hierarchical image data, wherein said information processing device downloads and acquires said tile images necessary to generate said displayed image, in accordance with the scale, resolution, and movement indicated in the change command, from an image data providing server;

a module configured to generate the displayed image, which is a whole image or a part of the whole image;

a module configured to receive a clip command;

a module configured to identify an area of the image to be clipped according to the clip command;

a module configured to generate a thumbnail image of a clipped image;

a module configured to acquire positional information identifying the position of the identified area in the whole image; and a module configured to store the thumbnail image and the positional information in a storage unit, mapping the thumbnail image and the positional information to each other.

* * * * *